April 22, 1952 — M. RAS — 2,594,214
ROLLER TRIP FOR PRINTING MACHINES
Filed April 5, 1949

INVENTOR:
Max Ras
by Sommers & Young
Attorneys

Patented Apr. 22, 1952

2,594,214

UNITED STATES PATENT OFFICE 2,594,214

ROLLER TRIP FOR PRINTING MACHINES

Max Ras, Zurich, Switzerland

Application April 5, 1949, Serial No. 85,669
In Switzerland November 22, 1948

5 Claims. (Cl. 101—145)

My present invention relates to improvements in tripping and roller lifting, supporting, adjusting and removing arrangements for the inking and damping rollers in printing machines.

In printing machines operating according to the principles of raised-type printing or depressed-type printing, the form is inked by means of inking or distributing rollers. In offset machines, similar rollers, but clad with a different material, perform the damping of the form. Such an inking or damping roller is rotatably mounted in the machine in two bearing means which, in connection with my present application, are called "trips".

As it is desired that the contact pressure of the inking roller against the form and the distributing roller be adjustable in magnitude, the trip has to permit to adjust the said pressure. Second, such pressure has to be removable when the operation of the machine is interrupted for any reason. Such lifting or removing of the pressure may be done manually or automatically by remote control. Tripping and lifting and adjusting the roller is carried out in prior art mostly by virtue of a triple-eccentric construction of the roller trip.

Figure 2A:
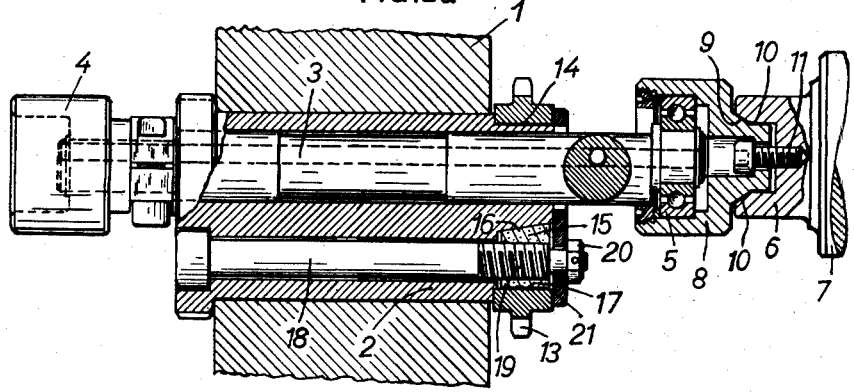
Figure 2B:
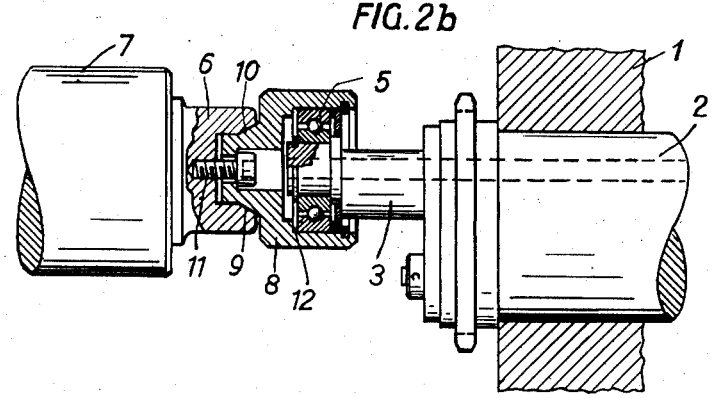
Figure 1:
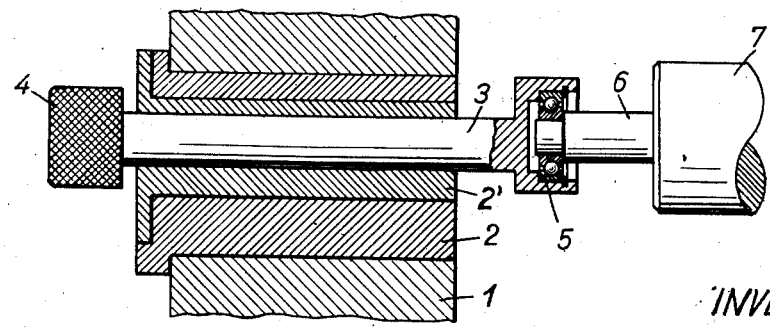

A roller trip of known construction, and a roller trip according to my present invention are illustrated in the accompanying drawing, in which:

Fig. 1 shows schematically the construction of a roller trip of known design, and Figs. 2a and 2b, belonging together, show an example of my present invention in axial section.

In Fig. 1, showing a known construction, the roller-trip member 2 is rotatably mounted in the machine sidewall 1. An eccentric bush 2' is rotatably mounted in an eccentric bore of member 2, and an axle 3 is mounted in an eccentric bore of bush 2', being rotatable therein by means of a knob 4. The outer race of a ball- or self aligning bearing 5 is eccentrically mounted on the axle 3 at the end facing the roller 7, and the pin 6 of roller 7 is plugged in the inner race of said bearing. Axle 3, thus, represents the roller-carrier proper. Roller 7 is tripped or lifted by turning the member 2, and a locking means (not shown) is provided in order to ensure the proper resetting of the adjusted roller 7 when re-tripping the latter. Roller 7 is adjusted, for the purpose of regulating its contact pressure against the distributor roller or the form, by turning the eccentric bush 2' or axle 3 respectively. The roller 7 is removed from the machine by slacking the said locking means, thus releasing the axle 3 which then is withdrawn by means of knob 4, thus also withdrawing the bearing 5 and releasing the pin 6 of roller 7.

Such known structural arrangement has the following disadvantages:

First, in order to permit to readily insert pin 6 of roller 7 into the machine, said pin has to have a certain clearance in the inner race of bearing 5, with the result that roller 7 is not positively centered, i. e. has a slight radial clearance. The bearing 5, therefore, might stand still and pin 6 rotate relative to the inner race of the bearing.

Second, as the roller 7 in operation warms up, it expands, i. e. becomes longer, and the tolerances in length which are inevitable in the manufacture of the roller and trip also have an effect in a positive or negative sense. Since the rollers have to be interchangeable, such differences are of particular weight. The roller, therefore, must have axial play. The roller 7 receives the ink (or the water in the case of damping rollers in offset machines) through a distributor roller which also contacts the same. Such brayer in operation not only rotates, but also undergoes an axially reciprocating movement, and tends to transmit the latter onto the roller 7 which in fact follows the distributor roller as far as permitted by its axial play. In practice it has been found, however, that even minute axial movements of a roller 7 have a deleterious effect on the printing form. In offset machines, the grain of the form is worn off, thus subjecting the latter to premature wear. In raised-type printing machines, the ink is accumulated laterally of the types and the like when the roller 7 is axially reciprocated, thus giving rise to a smudging of the form and also to a blurring and smudging of the impression.

Third, the two pins 6 of the roller 7, when demounting the latter from the machine, are liable to become easily damaged, e. g. when depositing the roller on the floor.

The roller trip according to my present invention eliminates the said disadvantages. Each of the two pins of a roller is securely screwed, through a conical seat, to the revolving part of the ball bearing, thus eliminating any radial or axial play between the bearing and roller. Only the bearing at one end of the roller has axial play for the purpose of accommodating thermal elongations and differences of length of the rollers.

In Figs. 2a and 2b, which belong to one and the same roller 7, the numerals 1-7 designate the same parts as in Fig. 1. The revolving casing 8 of the ball bearing 5 is provided with an outside conical shoulder 9 which co-acts with a corresponding inside conical shoulder 10 on pin 6. The latter is securely connected to the revolving casing 8 through a screw 11, thus eliminating any radial and axial play between bearing 5 and pin 6. In order, however, to accommodate thermal elongations and tolerances in the length of the rollers, one of the two bearings 5, i. e. that shown in Fig. 2b, has axial play at 12 in casing 8, while the other bearing, i. e. that shown in Fig. 2a, has no axial play. By reason of the fact that the pin 6 has an inside conical shoulder 10, the latter cannot be easily damaged on removing the roller from the machine and putting the pin 6 on a support, and the bearing arrangement of the roller without radial nor axial play remains intact.

The roller trip shown is adapted for automatic tripping and lifting which is accomplished by turning the member 2 in frame 1. For such purpose, a sprocket 13 is provided, which is mounted loosely rotatable on member 2 at 14. Further, a brake block 15 having a skewed face 16 is provided, which is adjustable in the axial direction of member 2. The said skewed face is slidable on a corresponding skewed face of member 2, and the radially outside face 17 of said block 15 coacts with the bore-wall of sprocket 13 so as to lock the latter in an adjusted position on member 2. The brake block 15 is set through a drag screw 18, the threads 19 of which are engaged to inside threads provided on block 15. In order to slack the said locking means, a set collar 20 is provided on the end of screw 18. The said collar abuts against a washer 21 which is supported on member 2. When slacking the screw 18, the block 15 is displaced to the right in Fig. 2a and the two skewed faces are disengaged from each other. The roller trip or, possibly, the roller itself is fixed in its proper setting by means of the screw 18 and brake block 15. The chain (not shown) is located in its terminal positions (pressure applied and pressure thrown out).

What I claim as new and desire to secure by Letters Patent, is:

1. In a roller trip for printing machines including an axle mounted rotatably and eccentrically in the trip member which in its turn is mounted eccentrically and rotatably adjustable in the machine frame, ball bearings provided at the ends of said axle, a roller having pins at each end, a seat member having an outside conical shoulder, said pin member having an inside conical shoulder engaging said outside shoulder, so that said inside shoulder is protected against being damaged when removing the roller from the machine frame and setting the said pins on a support, said seat member being screwed to said pin and connected to said ball bearing for eliminating any radial and axial play between said bearing and roller the said bearing at one end of the roller having axial play for accommodating thermal elongations and tolerances in length of the roller, the ball bearing having an inner race mounted eccentrically on said axle, and a mechanism arranged in the trip member for rotatably adjusting and setting the said member in the machine frame.

2. A roller trip as set out in claim 1, in which said trip member has a cylindrical outer surface, said adjusting mechanism comprising an actuating sprocket mounted freely rotatable upon the outer surface of said member, a brake block having an axially extending skewed face, said sprocket mounting surface being provided with a recess accommodating said block and having a skewed surface complementary to the skewed surface of the block, and a drag screw traversing the said member engaging with said block to lock the said sprocket to the latter on being tightened.

3. A roller trip as set out in claim 1, and in which trip member has a cylindrical outer surface, said adjusting mechanism comprising an actuating sprocket mounted freely rotatable upon the outer surface of said member, a brake block having an axially extending skewed face, said sprocket mounting surface being provided with a recess accommodating said block and having a skewed surface complementary to the skewed surface of the block, and a drag screw traversing the said member engaging with said block to lock the said sprocket to the latter on being tightened, and a set collar pinned to the outside end of said screw and adapted to coact with a washer mounted on the said member for the purpose of slacking the said brake block from its locking position.

4. A roller trip as set out in claim 1 in which the said mechanism comprises an actuating sprocket mounted loosely on said member, a brake block having an axially extending skewed face, and a drag screw traversing the said member and adapted to lock the said sprocket to the latter on being tightened.

5. In a roller trip, a mechanism set out in claim 1, in which the said mechanism comprises an actuating sprocket mounted loosely on said member, a brake block having an axially extending skewed face, and a drag screw traversing the said member and adapted to lock the said sprocket to the latter on being tightened, a set collar pinned to the outside end of said screw and adapted to coact with a washer mounted on the said member for the purpose of slacking the said brake block from its locking position.

MAX RAS.

REFERENCES CITED

The following references are of record in the file of this patent:

UNITED STATES PATENTS

| Number | Name | Date |
| --- | --- | --- |
| 1,816,948 | Wood | Aug. 4, 1931 |
| 1,965,734 | Chandler | July 10, 1934 |
| 2,366,335 | Huck | Jan. 2, 1945 |
| 2,369,814 | Worthington | Feb. 20, 1945 |